United States Patent [19]

Guerin et al.

[11] Patent Number: 5,040,169
[45] Date of Patent: Aug. 13, 1991

[54] WAVELENGTH DIVISION PHOTONIC SWITCH

[75] Inventors: Roch A. Guerin, Yorktown Heights; Yeong-Chang Lien, Armonk, both of N.Y.

[73] Assignee: International Business Machines Corporation, Armonk, N.Y.

[21] Appl. No.: 384,601

[22] Filed: Jul. 25, 1989

[51] Int. Cl.$^5$ .............................................. H04J 14/02
[52] U.S. Cl. .................................................... 359/124
[58] Field of Search .................. 455/600; 370/1, 3, 4; 350/169, 96.15

[56] References Cited

FOREIGN PATENT DOCUMENTS 0077490 4/1986 Japan ..................................... 370/1
0238728 10/1988 Japan ..................................... 370/3

Primary Examiner—Reinhard J. Eisenzopf
Assistant Examiner—L. Van Beek
Attorney, Agent, or Firm—Douglas W. Cameron

[57] ABSTRACT

This invention describes a method of transmitting data through a passive central switching fabric, where data can be transmitted from any input port of the fabric to any output port of the fabric. The switching fabric has N multiplexors and N demultiplexors. The input ports of the demultiplexors are the input ports of the fabric, while the output ports of the multiplexors are the output ports of the fabric. The outputs of each demultiplexor lie in a horizontal plane, while the inputs of each multiplexor lie in a vertical plane. The outputs of the demultiplexors in the horizontal planes are butted against the inputs of the multiplexors so as to establish optical contact between the outputs of the demultiplexors and the inputs of the multiplexors. Modulated wavelengths are then demultiplexed and mutliplexed in such a fashion so as to allow data from any input port of the switching fabric to be transmitted to any output port of the switching fabric merely by modulating a corresponding one of N wavelengths.

10 Claims, 6 Drawing Sheets

FIG.4

| OUT PORT | | | | |
|---|---|---|---|---|
| | A | B | C | D |
| IN PORT A | W1 | W3 | W2 | W4 |
| B | W3 | W1 | W4 | W2 |
| C | W2 | W4 | W1 | W3 |
| D | W4 | W2 | W3 | W1 |

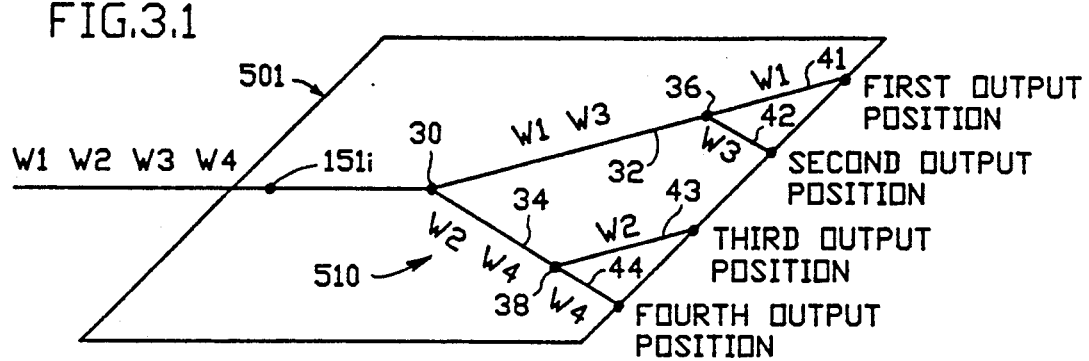
FIG. 3.1
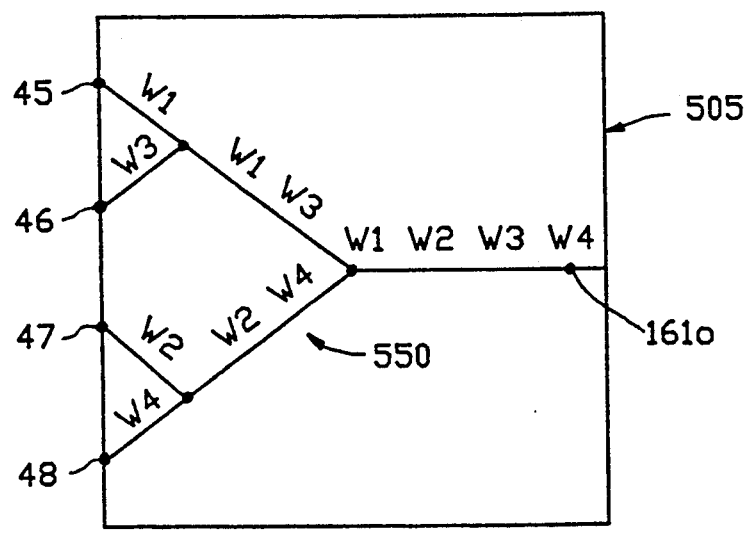
FIG. 3.2

WAVELENGTH DIVISION PHOTONIC SWITCH

TECHNICAL FIELD

The present invention relates to optical switching systems and in particular to wavelength division multiple access switching systems which use multiple wavelengths to route data from a multiplicity of input nodes to a multiplicity of outputs nodes. In this system the switching is achieved, in part, by means of wavelength assignment schemes and by passive multiplexing and demultiplexing devices in the switching network itself.

DESCRIPTION OF THE PRIOR ART

In recent years the rapid increase in transmission speed introduced by the use of optical fibers has emphasized the need for high speed optical switches (see [13]) and such products are (e.g., NEC NEOX32 photonic switching system), or will be made commercially available. Multiple optical structures have been investigated (see [14] or a brief review), and as these structures consist of Time Division, Space Division and Wavelength Division switches. Optical switches fall into two major categories: non-integrated and integrated switches.

Non-integrated switches are typically intended for application which do not require high speed reconfiguration. Such systems can be simple mechanical fiber switches [3, 16] or use piezo-electric or even holographic arrays [1, 7]. Most advanced optical switches are, however, integrated switches that rely on optical couplers, splitters (demultiplexors) and combiners (multiplexors). Early work on such integrated optical switched concentrated on space switches where eletronically controlled crosspoints achieved connectivity between inputs and outputs [2, 4-6, 10, 12, 15, 19, 20]. However, as the number of wavelengths at which lasers and optical filters could operate increased, wavelength based switched became feasible [8]. One major advantage presented by this latter class of switches is that control of the switch can now be distributed to the inputs or outputs rather than be centralized. This helps overcome the speed limitation of electronic controllers to take full advantage of the high speed available from optical tachnology.

Wavelength division based switching systems fall into two categories: active and passive switches. Active switches require that the inputs/outputs of the switch are capable of adjusting the wavelength at which they are transmitting/receiving. This requires active components such as tunable lasers/filters. Examples of such systems are given in U.S. Pat. No. 3,912,876 to J. J. Muller, issued Oct. 14, 1975; in U.S. Pat No. 3,986,020 to H. W. Kogelnik, issued Oct. 12, 1976 and in U.K. Pat. No. GB 2,043,240 A to A. M. Hill, issued Oct. 1, 1980. The use of active devices not only limits the reconfiguration time of the switches, but also requires coordinated control between all input/output connections. For example, in a system where tunable lasers are used at the inputs, the case where two inputs tune to the same wavelengths and contend for the same output must be avoided. Similar problems exist when tunable filters are used at the outputs.

Passive optical switches avoid active components by using fixed input to output wavelength assignments so that the switching function does not require any modification of either the switch fabric or the input and output adapters, and also avoids the need for control elements. Such a system has been described in Japanese Pat No. JA 60-237793 to K. Nagashima, issued November 1984. This patent uses a cyclic wavelength assignment scheme which allows simultaneous communications between all inputs and all outputs. An N×N switch requires a set of N distinct wavelengths {W1,...,WN} and an input is assigned distinct wavelengths to transmit to each of the N outputs. The output wavelength assignment is cyclically shifted from input to input to ensure that no outputs receive the same wavelength from different inputs. The cyclic assignment is, however, entirely independent of the type of multiplexors and demultiplexors used in the system, and does not attempt to make use of their structure and characteristics.

REFERENCES

1. J. Bainerman, "Piezoelectric Switch Optical Signals", Lasers and Applications, vol. 3, no. 12, pp. 49-51, December 1984.
2. R. A. Becker and W. S. C. Chang, "Electrooptical Switching in Thin Film Waveguides for a Computer Communication Bus," "pplied Optics ", vol. 18, no. 19, October 1979, pp. 3296-3300.
3. A. El Fatatry, "1×n Optical Fibre Switch,"Electronic Letters, vol. 21, no. 14, pp. 618-619, July 1987.
4. P. Granestrand, B. Stoltzang, L. Thylen, K. Bergvall, W. Doldissen, H. Heinrich and D. Hoffman, "Strictly Non-Blocking 8×8 Integrated Optical Switch Matrix," Electronics Letters, vol. 22, no. 15, pp. 816-818, July 1986.
5. K. Habara and K. Kikuchi, "Optical Time-Division Space Switches Using Tree-Structured Directional Couplers," Electronics Letters, vol. 21, no. 14, pp. 631-632, July 1985.
6. K. Habara and K. Kikichi, "Geometrical Design Considerations for a tree structured Optical Switch Matrix," Electronics LEtters vol. 23, no. 8, pp. 376-377, April 1987.
7. J. P. Herriau and A. Delboulbé, B. Loiseaux and J. P. Huignard "Commutation Spatiale par Reaseau Holographique Photo-Induit", Rec. Tech. Thomson-CSF, vol. 15, no. 3, pp. 749-755, September 1983, pp. 749-775. In French.
8. G. R. Hill, "A Wavelength Routeing Approach to Optical Communication Networks", Telecom. Technol. J., vol 6, no. 3, July 1988, pp. 24-31.
9. A Himeno and M Kobayashi, "Single-Mode Guided-Wave Optical Gate Matrix Switch Using Mach-Zehnder Interferometer Gates," Electronics Letters vol. 23, no. 17, pp. 887-888, August 1987.
10. T Matsunaga, K. Kikuchi and M. Ikeda, "Optical Space Division Switching System Using Laser Diode Optical Switches," Proceedings of ISS'87, 1987.
11. S. P. Shipley, G. Georgiou and A. C. Boucouvalas, "Compact All-Fibre Mach-Zehnder Devices," IEE Proceedings vol. 134, Pt. J., no. 3, pp. 203-207, June 1987.
12. R. A. Spanke, "Architecture for Large Nonblocking Optical Space Switches," IEEE J. Quantum Electron, vol. QE-23, no. 6, pp. 964-967, June 1986.
13. P. R. Strauss, "Optical Switches Herald a New Age of Enlightenment Data Communications, " pp. 81-90, March 1988.
14. S. F. Su, L. Jou and J. Lenart, "A Review on Classification of Optical Switching Systems," IEEE Commun. Mag., vol. 24, no. 5, pp. 50-55, May 1986.
15. S. Suzuki, M. Kondoi, K. Nagashima, M. Mitsuhashi H. Nishimoto, T. Miyakawa, M. Iwasaki and Y. Ohta, "A 32- Line Optical Space Division Switching System Using 8×8 Optical Matrix Switches," NEC Res. and Develop., no., 87pp. 44–50, October 1987.

16. M Tatedaon, S.-I. furukawa and H. Miyokawa, "Low-Loss Large-Scale 1 ×N Optical Switch," Trans. IEICE, vol. E 70, no. 10, pp. 890–892, October 1987.

17. H. Toba, K. Inoue and K. Nosa, "A Conceptual Design on Optical Frequency-Division-Multiplexing Distribution Systems with Optical Tunable Filters," IEEE J. Selec. Areas Commun. vol. SAC-4, no. 9, pp. 1458–1467, December 1986.

18. H. Toba, K. Oda, N. Takato and K. Nosu, "5 Ghz-Spaced, Eight-Channel, Guided-Wave Multi/demultiplexer for Optical FDM Transmission Systems," Electronics Letters, vol. 23, no. 15, pp. 788–789, July 1987.

19. P. LiKam Wa, J. E. Sitch, N. J. Mason, J. S. Roberts and P. N. Robson, "All Optical Multiple-Quantum-Well Waveguide Switch," Electronic Letters vol. 21, no.1, pp. 26–28, January 1987.

20. J. E. Watson, M. E. Mildbrot and T. C. Rice, "A polarization-Independent 1 ×16 Guided-Wave Optical Switch Integrated on Lithium Niobate," IEEE J. Lightwave Technol., vol. LT-4, no. 11, pp. 1717–1721, November 1986.

SUMMARY OF THE INVENTION

It is, therefore, an object of this invention to provide a wavelength divisionbased switching system with fixed wavelength assignment schemes that take advantage of the characteristics of the multiplexors and demultiplexors. This results in a simple and compact structure for the switch fabric and allows for a high level of integration.

It is also an object of this invention to provide a passive integrated wavelength division optical switching system for a wavelength devision switching network.

It is another object of this invention to use N distint wavelengths to allow simultaneous and contention free transmission between all input and output ports of an N×N switching system. In the description of the preferred embodiment, it is assumed that $N=2^n$ where n is an interger, but other values are feasible.

It is another object of this invention to provide a wavelength assignment scheme taking into account the structure and characteristics of the demultiplexors and multiplexors to eliminate line cross-connections in the switch fabric. This assignment is, in particular, detailed for demultiplexors and multiplexors made up of Mach-Zehnder filters of the interferometer type.

It is a further object of this invention to provide a method to arrange the demultiplexors and multiplexors used in the switch fabirc to obtain an integrated and compact structure. This method is again detailed for demultiplexors and multiplexors made up of Mach-Zehnder filters of the interferometer type.

In this invention, a number (N) of input nodes having a plurality of sources are connected, through a central switching fabric, to a number (N) of output nodes consisting of a plurality of destinations. Each input node has the capacity to send data simultaneously to all output nodes and, conversely, each output node can receive data simultaneously from all input nodes. Each input node uses an input interface to the switch fabric. The interface modulates wavelengths with data according to their intended output node. Similarly, each output node uses an output interface which identifies data received at a particular wavelength as orginating from a given input node.

In the input interface, data for ech of the N output nodes are forwarded to optical transmitters (e.g., lasers) operating at different wavelengths. Each individual data stream is used to modulate its own transmitter, and the N resulting modulated wavelengths are then multiplexed and sent over a single fiber to the central switch fabric.

In the central switch fabric the optical signals coming from each input interface are received at a switch input port, which is actually the input port of a demultiplexor of the fabric. The signals are then demultiplexed and recombined or multiplexed according to their intended output node, before being forwarded to the corresponding switch output port, which is actually the output port of a multiplexor. The input node to output node wavelength assignment ensures that no two input nodes use the same wavelength to communicate with a given output node. In addition, the wavelength assignment is such that the demultiplexors and multiplexors used in the central switch fabric can be simply stacked and butted so as to achieve an integrated and compact structure. This aspect is detailed later in the description of the preferred embodiment.

The assignment scheme of this invention is particularly significant in that it allows for the compact structure of the switch fabric. This schmeme is effected by the demultiplexors of the switching fabric. To describe the assignment scheme the method of demultiplexing $N=2^n$ modulated wavelengths will be described for one of the demultiplexors of the switching fabric, and the assignment scheme for each other of the N demultiplexors can easily be derived from the assignment scheme for the one demultiplexor. First, N modulated wavelengths are demultiplexed by one of the demultiplexors by separating the N modulated wavelengths at a first branch point of the demultiplexor into two distinct first subgroups, each having N/2 modulated wavelengths. Each first subgroup is then assigned to one of a pair of first branches extending from the first branch point. Each first subgroup of N/2 modulated wavelengths is further separated at a corresponding second branch point on each one of the first branches into two distinct second subgroups pf N/4 modulated wavelengths resulting in four distinct second subgroups. Each second subgroup is then assigned to one of a pair of second branches extending from a corresponding second branch point. This separation continues as above until each n-th subgroup has only one modulated wavelength therein. The n-th branches of the demultiplexor are the N outputs of the demultiplexor. Thus, for the one demultiplexor an assignment scheme of subgroups to branches is formed. N modulated wavelengths are demultiplexed in the same manner as described above for each other of the N multiplexors; however, the assignment scheme for the other demultiplexors is a permutation of the assignment scheme for the one demultiplexor with the assignment scheme of subgroups to branches being different for each of the N multiplexors. The assignment scheme does, however, have certain restrictions. First, no two outputs (n-th branches) in the same output position of any two demultiplexors have the same wavelength assigned thereto. Second, each subgroup for each assignment scheme still have the same wavelengths therein. Third, and finally, each pair of subgroups assigned to branches extending from a common branch point must always be assigned to branches extending from a common branch point in any assignment scheme. Using the above assignment scheme, along with its restrictions, if the modulated wavelength appearing on each output of each demultiplexor corresponds to a modulated wavelength assigned to each output (n-th branch), there will be N horizontal planes with N distinct modulated wavelengths appearing in each plane. In addition, for any given output position in the N horizontal planes, there will be N distinct modulated wavelengths. Since the same output position in N horizontal planes lies in a vertical plane, there will be N distinct modulated wavelengths in each of the the N vertical planes. The N modulated wavelengths in each vertical plane are then multiplexed so that a signal having N modulated wavelengths appears at the output port of each multiplexor.

The optical signal coming out on the optical fiber at each output port of the switch fabric has N, one per input node, distinct modulated wavelengths. This signal is forwarded to a given output node where an output interface demultiplexes the N incoming modulated wavelengths and applies each of them to its own receiver. The original data coming from the N input nodes are then recovered and forwarded to their respective final destinations.

BRIEF DESCRIPTION OF THE DRAWINGS

The different aspects and components of the invention are better understood with reference to the detailed drawings described below. For simplicity and clarity the number N of input and output nodes has been fixed to four (4) in all drawings. It should, however, be clear that this choice is for illustration purposes only and that the concepts can be extended to any value of N.

FIG. 3 is a representation of a demultiplexor of the switch fabric in this invention.

FIG. 4 is a table showing the correspondence between wavelengths, to be modulated and transmitted, and a given input port and selected output port.

DESCRIPTION OF THE PREFERRED EMBODIMENT

The embodiment of the invention described below is in the context of a switching system for a digital network. An overview of the wavelength division switching network system is first provided with reference to FIG. 1 while a more detailed description is given with reference to FIGS. 2-6. For simplicity, the size of the system is taken to be N=4, and this number is used in all figures.

Figure 1:
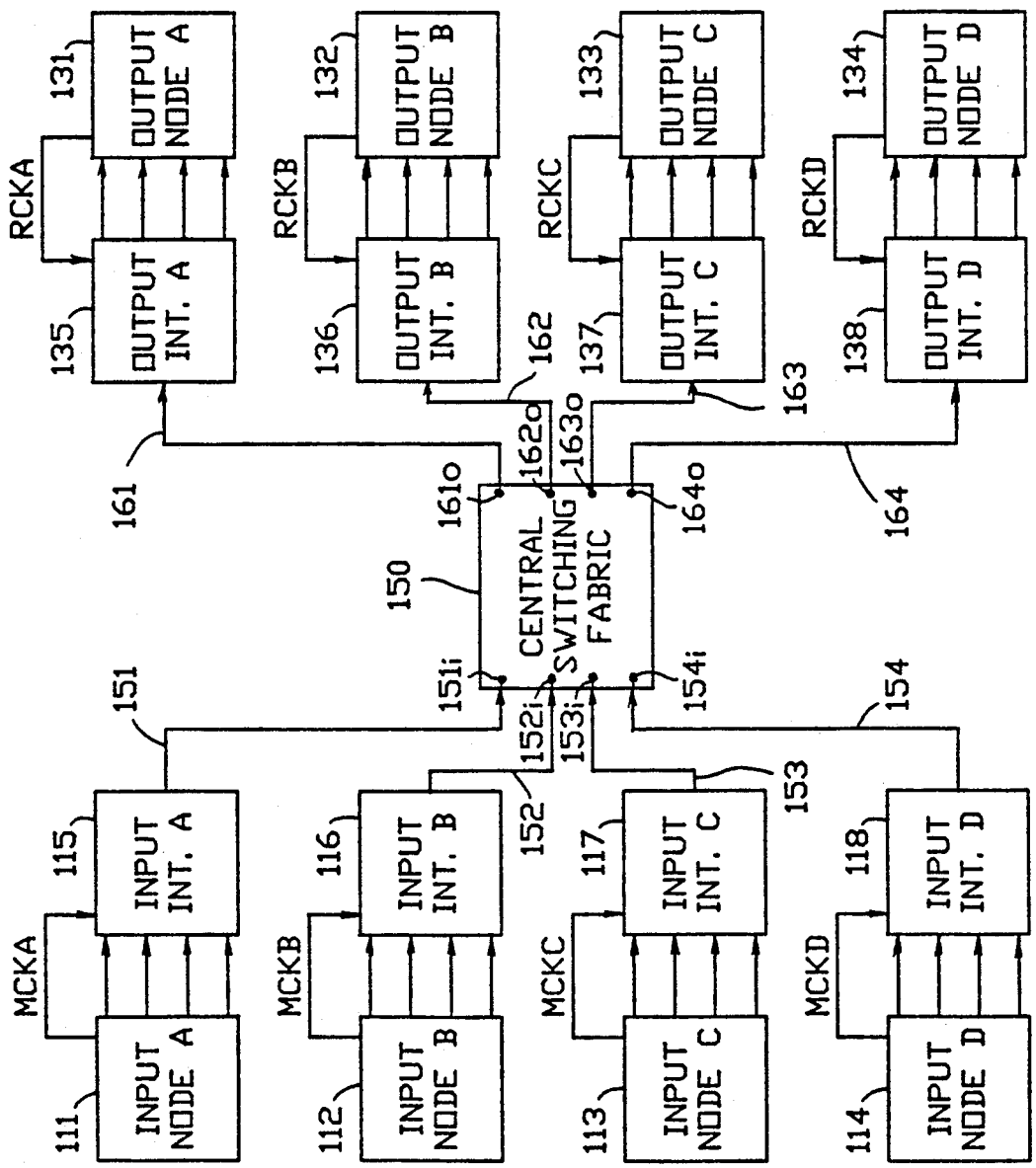
FIG. 1 is a block diagram of the embodiment of a switching system as described in the present invention. It consists of 4 input nodes, 4 input interfaces, a central switch fabric, 4 output interfaces and 4 output nodes. Each input interface is connected to the optical switch fabric by a dedicated optical fiber. Similarly, outgoing dedicated optical fibers connect the optical switch fabric to the 4 output interfaces which are, in turn, connected to their respective output node.

In a system described in FIG. 1, four input/output nodes (111-114/131-134) labeled A through D, have ports coupled to the central switching fabric through input/output interfaces 115-118/135-138 so that any input node may communicate with any other output node. Also schematically illustrated in FIG. 1 are the input ports 151$i$-154$i$ and output ports 161$o$-164$o$ of the central switching fabric 150. Each of the input ports are actually input ports of demultiplexors of the switching fabric, while the output ports are actually output ports of the multiplexors of the switching fabric. Each input/output port interface is, on one side, coupled to the corresponding input/output node while the other side is connected to the switch fabric 150 by means of an optical link. With reference to FIG. 1, optical links from input interfaces A through D are represented by the links 151-154 respectively. Similarly, the optical links from the central switching fabric to output interfaces A through D are represented by the links 161-164 respectively. In this embodiment of the switching system, the optical channels consist of single mode fibers. Other types of fibers could possibly be used.

Each input interface receives data from its input node destined to any of the N output nodes. Data destined to different output nodes are forwarded to optical transmitters operating at different wavelengths such that, for every input interface (or input port), each wavelength is uniquely associated to a given output interface (or output port), and no two input interfaces (or input ports) use the same wavelength to communicate with a given output. A particular wavelength assignment satisfying these requirements while taking into account the structure of the multiplexors and demultiplexors used is detailed below. Each input interface also receives a clock signal (e.g., MCKA for input interface 112) from its input node. This clock signal is used to generate the various clocks needed in each input interface. It should be noted that the clock signals provided by the different input nodes to the input interfaces need not be identical. In other words MCKA, MCKB, MCKC and MCKD can all be distinct. This allows the system to operate asynchronously.

In each input interface a multiplexor multiplexes the optical signals at different wavelengths destined to different output ports. The output of each input interface (115-118) is coupled to one of the optical fiber links (151-154). Each outgoing optical link is connected to one of the input ports 151$i$-154$i$ of the central switching fabric 150. Within the central switching fabric 150, the optical signal, having N modulated wavelengths from each input port is first demultiplexed into its N distinct modulated wavelengths (one for each output node). A modulated wavelength is a wavelength that has been modulated by data to be transmitted. The N distinct modulated wavelengths from all N input ports and headed for the same node are then re-multiplexed and forwarded to the corresponding central switching fabric output port, which is an output port of a corresponding multiplexor. Each central switching fabric output port corresponds to a given output node to which it is linked by means of an optical fiber link connected to the associated output interface (links 161-164 connected to output interfaces 135-138 respectively).

The optical signal carried by each optical link (161-164) coming from the central switching fabric 150 is received by the corresponding output interface (135-138 respectively). Each output interface demultiplexes the received optical signal into its N distinct modulated wavelengths. Each modulated wavelength carries data coming from a different input node. After the optical signals from different wavelengths have been demultiplexed and the information they carried received, data are made available to the output node which then forwards them to their final destination. Each output node provides a clock signal (RCKA, RCKB, RCKC and RCKD for output nodes 131-134 respectively) which is used to synchronize how data are read from the output interface. Note again that the clock signals from different output nodes need not be identical.

A more detailed description of the wavelength division switching system described above is now provided. The structure of an input interface is first detailed and possible implementations of the transmitters and the multiplexor are discussed. The structure of a central switching fabric based on using Mach-Zehnder filters is then briefly explained, and the wavelength assignment is presented and related to the switch fabric itself. Finally, the structure of the output interface is detailed. The descriptions are made with reference to FIG. 2 to FIG. 6 and N=4 is assumed.

Figure 2:
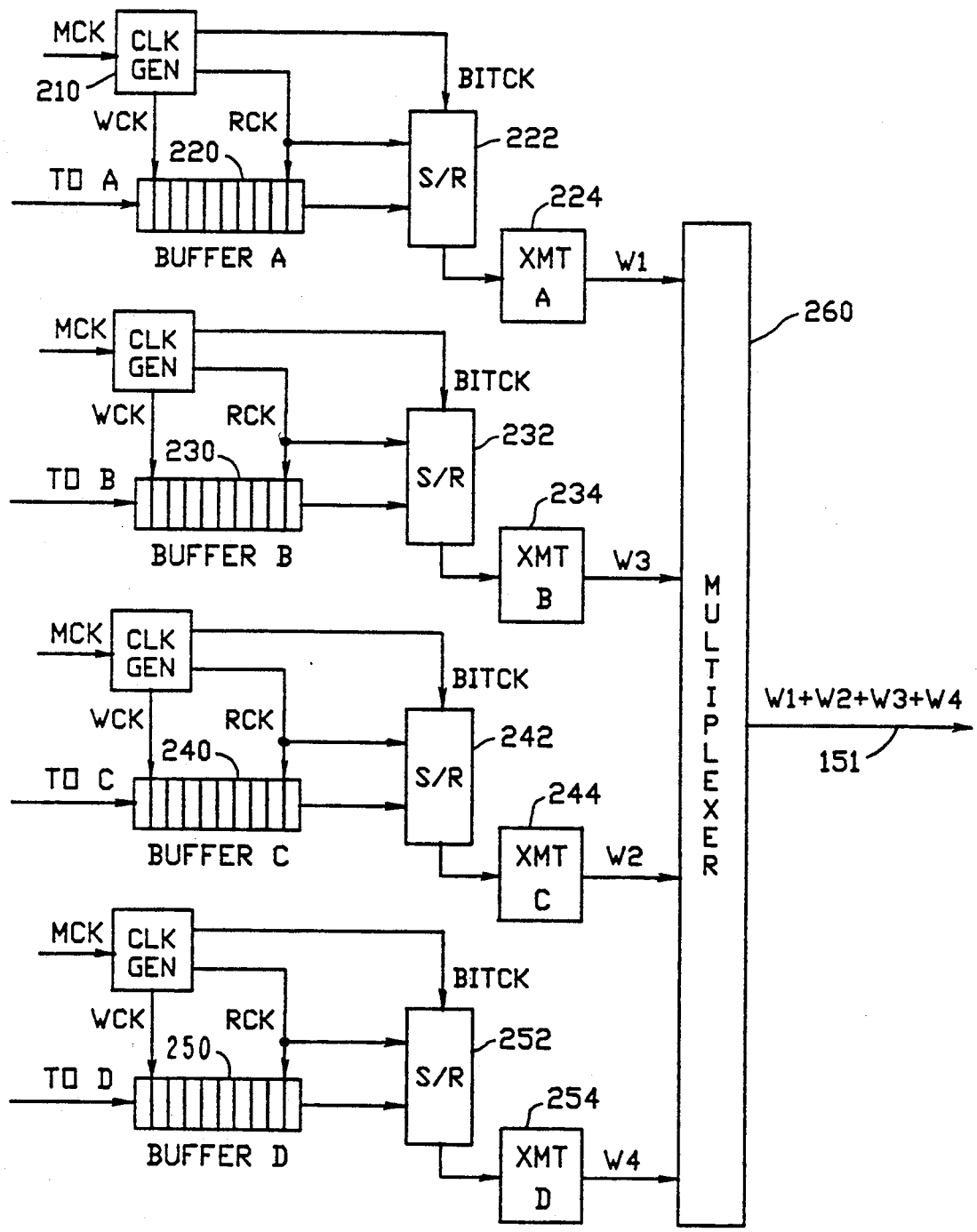
FIG. 2 is a block diagram of an input interface suitable for use in the Wavelength Division Switching Network system shown in FIG. 1.

As shown in FIG. 2 an input interface receives simultaneously four data streams, one for each output node. It is assumed that the four signals are received byte-wise and are stored in separate buffers (220, 230, 240 and 250 for output nodes A, B, C and D respectively). The byte format of the received data is used for illustration purposes only and any other format could potentially be used. The write clock (WCK) for the buffers is provided by a clock generator 210 to each of the four buffers 220, 230, 240 and 250. The clock generator 210 also generates a read clock RCK, used to read data out of the buffers, and a bit clock BITCK eight times faster than RCK (assuming byte-wide buffers). Note that, for simplicity, one common clock generator is used for the whole input interface. Different clock generators could, however, be used for data stream inputs destined to different output nodes as they need not be synchronized.

During each cycle of the RCK clock, data bytes are read from the buffers 220, 230, 240 and 250 and loaded into the parallel-in-serial-out shift registers 222, 232, 242 and 252. Within each cycle of RCK the 8 bits loaded into the shift registers are read out serially at BITCK and forwarded to the respective optical transmitters 224, 234, 244 and 254 each operating at a different wavelength. The output signals (modulated wavelengths of the transmitters 224, 234, 244 and 254 are then multiplexed through a multiplexor 260 and transmitted over the optical link 151.

Several solutions can be used to implement the transmitters and the associated multiplexor in the input interface. One solution integrates both the transmitters and the multiplexor on the same device. Such an approach is described in U.S. Pat. No. 3,908,121 to L. A. Riseberg et al., issued Sept. 23, 1975. Another possibility is to have separate sources and a multiplexor. In other words, the transmitter are, for example, individual lasers operating at different wavelengths and the multiplexor is a separate device such as the one described in U.S. Pat. No. 4,483,582 to S. K. Sheem, issued Nov. 20, 1984 or a Mach-Zehnder filter similar to those used in the switch fabric. As we shall see, this solution is potentially preferable as it reduces the number of distinct parts used in the system.

The wavelengths assigned to the different transmitters depend on both the output node to which the transmitters send data and the input interface where they are located. In other words, a transmitter sending data to, for example, output node A is assigned a different wavelength in each input interface. This is required so that output nodes can receive data simultaneously from all input nodes. In addition to satisfying the above requirement, the assignment schemes described in this invention takes into account the structure of the central switching fabric. Its purpose is best understood after describing the central switching fabric which first requires a brief explanation of the structure of the fabric.

We assume that $N=2^n$ and that the N distinct wavelengths used are equispaced by frequency f. The structure of the fabric based on using Mach-Zehnder filters is now described. Such fabric has a tree structure where the multiplexing/demultiplexing function is gradually performed at the branch points of the tree, where a branch point has two branches extending therefrom.

With each demultiplexor of the central switching fabric, the first branch point receives modulated wavelengths W1, W2, ... W$2^n$, and separates them into two equal first subgroups. One first subgroup contains all odd numbered modulated wavelengths W1, W3, ..., W($2^n-1$), while the other first subgroup contains even numbered modulated wavelengths W2, W4, ..., W$2^n$. Each first subgroup is then assigned to one of a pair of first branches extending from a first branch point. The partition is achieved by properly adjusting the length difference $\Delta l_1$ of the two arms of the first branch point (Mach-Zehnder filter) ($\Delta l_1 = c/2rf$, where c is the velocity of light in a vacuum, r is the refractive index of the waveguide, and f is the frequency spacing between wavelengths). For a more detailed explanation see reference 17. Each of the second branch points of the demultiplexor acts in a similar manner, by separating again incoming wavelengths into two second subgroups of equispaced modulated wavelengths (each second branch point uses $\Delta l_2 = \Delta l_1/2$). For example, the first subgroup containing modulated wavelengths W1, W3, ... W($2^n-1$) are partitioned into one second subgroup containing modulated wavelengths W1, W5, ..., W($2^n-3$) and another second subgroup containing modulated wavelengths W3, W7, ..., W($2^n-1$). Each second subgroup is then assigned to one of a pair of second branches extending from a corresponding second branch point. A similar partition is performed with even numbered modulated wavelengths. These successive partitions into smaller and smaller subgroups with alternate modulated wavelengths continue until each of the n-th subgroups consists of a single modulated wavelength, at which point the demultiplexing is completed. The frequency separation $S_x$ between wavelengths in any x-th subgroup can be obtained by the formula $S_x = 2^x(f)$ where f is the frequency separation in the original group of wavelengths W1, W2, ... WN. Then, each n-th subgroup which consists of only one modulated wavelength is assigned to a corresponding n-th branch which is actually an output of the demultiplexor of the central switching fabric. The above assignment of first, second, ... and n-th subgroups to branches shall be referred to as an assignment scheme for a demultiplexor.

Shown in FIG. 3.1 is a schematic illustration of a demultiplexor of the switching fabric, and the associated assignment scheme for that demultiplexor. The multiplexor in this example has an input port 151*i*, one first branch point 30, two first branches 32 and 34, two second branch points 36 and 38, and four second branches or outputs 41-44. Shown are N=4 modulated wavelength W1, ..., W4 being demultiplexed into N distinct modulated wavelengths. The four distinct modulated wavelengths are separated at first branch point 30 into two distinct first subgroups with each first subgroup having N/2=2 modulated wavelengths. One first subgroup has modulated wavelengths W1 and W3, while the other first subgroup has modulated wavelengths W2 and W4. The one first subgroup is assigned to a first branch 32 extending from first branch point 30, while the other first subgroup is assigned to first branch 34. The first subgroups are then further separated at second branch points 36 and 38 to form four distinct second subgroups. Since the second subgroups have only one modulated wavelength in each second subgroup, no further separation is required. The second subgroups are assigned to corresponding second branches 41-44. This assignment of subgroups to branches is referred to as an assignment scheme for a demultiplexor of the switching fabric. The second branches in this case (n=2) are actually the outputs of the demultiplexor, and these outputs will all appear in one of the N horizontal planes. The position of these outputs relative to one another is referred to as the output position in the horizontal planes. For example, W1 could be said to be in the first output position while W3, W2 and W4 could be said to be in the second, third and fourth output positions respectively. As discussed in the next paragraph, other demultiplexors of the switching fabric will also have assignment schemes similar to the above assignment schemes. Further, there will be four output positions for each of the demultiplexors, and the same output position in the four horizontal planes will appear in one of the N=4 vertical planes. Once one assignment scheme for a demultiplexor is obtained, the other assignment schemes for the demultiplexors is merely a permutation of the first assignment scheme obtained. An assignment scheme, however, is not just any permutation of the original assignment scheme obtained. There are certain restrictions. First, no two outputs (n-th branches) in the same output position of any two demultiplexors have the same wavelength assigned thereto. Second, each subgroup for each assignment scheme will have the same wavelengths therein. Third, and finally, each pair of subgroups assigned to branches extending from a common branch point must always be assigned to branches extending from the common branch point in any assignment scheme. Using the above assignment schemes, along with the restrictions, if the modulated wavelength appearing on each output of each demultiplexor corresponds to modulated wavelength assigned to each output (n-th branch), there will be N horizontal planes with N distinct modulated wavelengths appearing in each plane. It should be noted that there are as many assignment schemes as demultiplexors in the switching fabric. In addition, for any given output position in the N horizontal planes, there will be N distinct modulated wavelengths. Moreover, since the same output position in N horizontal planes lies in a vertical plane, there will be N distinct modulated wavelengths in each of the N vertical planes. The N modulated wavelengths in each vertical plane are then multiplexed so that a signal having N modulated wavelengths appears at each output port of each multiplexor. Shown in FIG. 3.2 is a schematic illustration of one (550) of the four multiplexors of the central switching fabric. Note that the inputs 45-48 all lie in a vertical plane 505. Note also that the modulated wavelengths appearing at these inputs correspond to modulated wavelengths appearing at the first output position of the four demultiplexors. See FIG. 5.

Referring to FIG. 2, there is shown a schematic illustration of the input interface (115) node A (111). The other input interfaces are similar in structure.

With reference to FIG. 2, the transmitter 224, 234, 244 and 254 are used for transmission to output nodes A, B, C and D using wavelengths W1, W2, W3 and W4 respectively. The table given in FIG. 4 gives the complete wavelength correspondence, where 'In' indicates the input interface where the transmitters are located and 'Out' gives the destination output node.

The above correspondence satisfies the requirement that each input uses different wavelengths for each output and that for a given output the wavelengths used by each input are different. The main feature of correspondence is, however, its impact on the structure of the central switching fabric as illustrated in FIG. 5 when used with the assignment scheme for each of the demultiplexors of the switching fabric.

Figure 5:
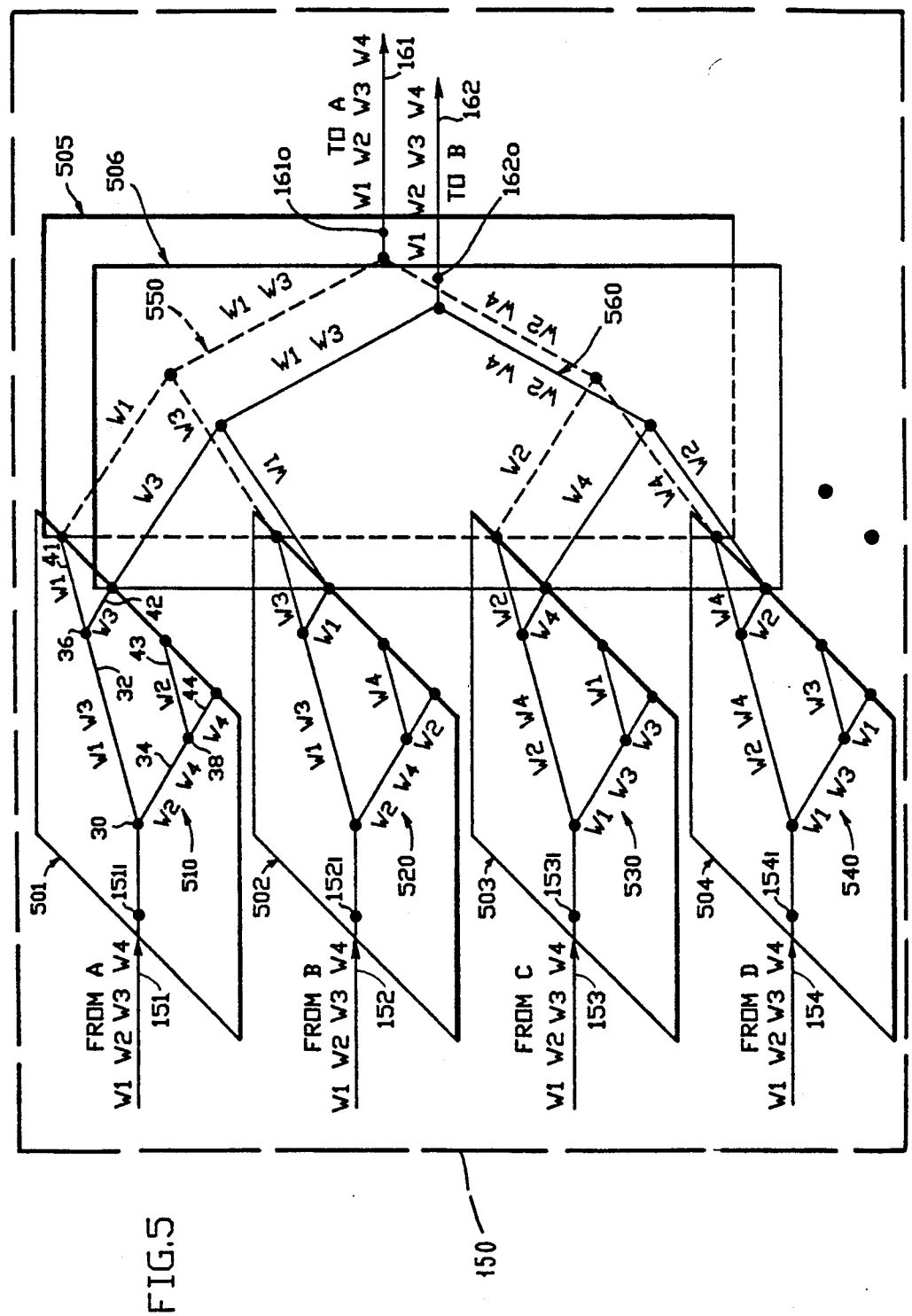
FIG. 5 is a schematic illustration of a 4×4 central switching fabric with 4 demultiplexors each of whose outputs lie in a horizontal plane. Also shown are the inputs of two of the four multiplexors, each of whose inputs lie in a vertical plane.

Referring to FIG. 5, the central switching fabric 150 receives the optical signals coming from the four input interfaces A, B, C and D (115-118 of FIG. 1, respectively) on four incoming optical links 151-154 respectively. Similarly, the switch fabric forwards optical signals to the four output interfaces A, B, and D (135-138 of FIG. 1 respectively on four outgoing optical links 161-164). For clarity, only two (161 and 162) of the four outgoing optical links are represented in the figure.

The incoming optical links 151-154 are connected to the demultiplexors at input ports 151*i*-154*i*, respectively. These demultiplexors use Mach-Zehnder interferometer type filters and are obtained by simple modification (permutation) of the assignment scheme shown in FIG. 3.1. Such demultiplexors, as described in [18] can be implemented using an integrated wave-guide structure on a silicon substrate (other types of implementations are possible, see for example [11]). This allows for small compact devices. The different assignment schemes for the various multiplexors (510, 520, 530, 540) of the switching fabric can be obtained by simple permutation of subgroups between branches extending from the same branch point. The four assignment schemes, one for each of the four demultiplexors, are also shown in FIG. 5. Notice that the assignment scheme for demultiplexor 510 is the same as the assignment scheme shown in FIG. 3.1. Also, observe that the array of outputs of the four multiplexors and the modulated wavelengths assigned thereto corresponds to the array of wavelengths shown in FIG. 4. These permutations are chosen such that the ordering of the demultiplexed wavelengths present at the n-th branches (outputs of the demultiplexors or "leaves") of the tree-structured demultiplexors 510, 520, 530 and 540 corresponds to the ordering specified in rows A, B, C and D respectively of the wavelength correspondence table shown in FIG. 4. Other variations of table 4 would also be permissible, such as permuting the rows or columns of table 4.

Referring again to FIG. 5, in the switch fabric the demultiplexors 510, 520, 530 and 540 are stacked on top of each other so that their output (leaves) are vertically aligned. Notice, that the outputs of each demultiplexor lie in a corresponding horizontal plane while the inputs of each multiplexor lie in a corresponding vertical plane. Shown in FIG. 5 are four such horizontal planes (501-504) and two (505-506) of four such vertical planes, although the planes could be merely two sets of planes with planes in each set being parallel or non-intersecting within the fabric. A set of the latter planes will be referred to as non-intersecting planes. However, all of the planes in the first set must intersect all of the planes in the second set. Because the wavelength assignment schemes take into account the tree-structure of the demultiplexors, the outputs of the demultiplexors which are aligned along a vertical axis carry distinct wavelengths and are destined to the same output node. This means that wavelengths destined to the same output now always lie on the same vertical axis (or in the same output position in N horizontal planes) and can therefore easily be recombined while avoiding any line crossing.

Referring to FIG. 4, the input to output wavelength correspondence is determined by the assignment scheme used to construct each demultiplexor of the switch fabric. Once the assignment of n-th subgroups to n-th branches is complete, the wavelength correspondence is set. The requirement is that for any output position of the demultiplexors used in the switch fabric all the associated wavelengths must be from distinct wavelengths. As there are $2^{log N} = N$ permutations of the tree structure such that, for any output position of the demultiplexors, the wavelengths are distinct, it is possible to obtain the complete wavelength correspondence by systematically constructing all the above assignment schemes of the tree structure. The table of FIG. 4 illustrates this construction in the case N=4. If one wishes to transmit data from input port B (152i) to output port D (164o), one could see from table 4, that one must modulate wavelength W2 with the data.

Multiplexing the wavelengths heading for a given output port simply requires that a multiplexor or coupler be vertically butted to the same output position of the horizontally stacked demultiplexors which position lies along the appropriate vertical axis, and in the N horizontal planes. Multiplexing can be achieved using either standard couplers or multiplexors symmetrical in structure to the switch demultiplexors 510, 520, 530 and 540. This approach is assumed in FIG. 5 where multiplexor 550 is symmetrical to demultiplexor 510 and, similarly, multiplexor 560 is symmetrical to demultiplexor 520. In general, it can be seen that the multiplexor for output node k is identical to the demultiplexor for input node k, where k=A, B, C, or D. Such a solution presents the additional advantage of decreasing the number of parts needed in the system.

The optical signals from different wavelengths and headed for the same output are recombined in the multiplexors, and then they are transmitted over optical fiber links (for example, over link 161 from multiplexor 550) which are connected to a corresponding output interface. It should be noted that the switch fabric is entirely passive and simply routes incoming optical signal to an appropriate output port.

After being sent over an optical fiber link leaving the switch fabric 150, the optical signal carrying information from all input nodes and destined to a given output node is received by the corresponding output interface. The structure of such an output interface, for example output interface 135, is described in FIG. 6. The optical signals consisting of four modulated wavelengths from wavelengths W1, W2, W3 and W4 arrive over the optical fiber link 161, for example. As mentioned earlier, the correspondence of wavelengths W1, W2, W3 and W4 to input and output ports depends on which output port they are destined for and from which input port they came. These wavelengths can be deduced by reference to the table of FIG. 4. For example, wavelength W3 from input port A (151i) corresponds to output port B (162o), and wavelength W3, from input port B (152i) corresponds to output port A. Thus, if one wished to transmit data from input port A to output port B, one would transmit the modulated wavelength W3 (modulated by the last mentioned data) through the switching fabric 150.

Figure 6:
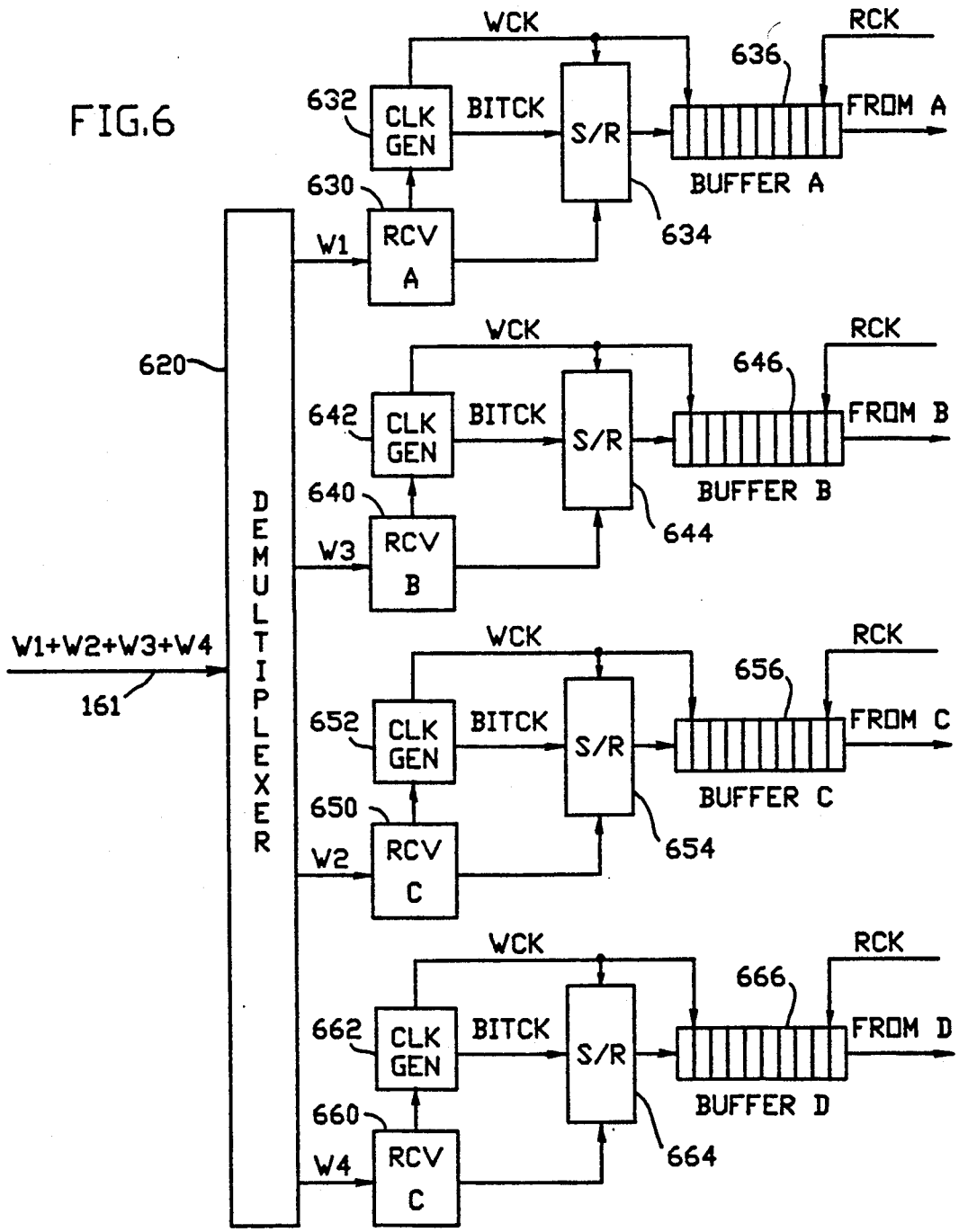
FIG. 6 is a block diagram of an input interface suitable for use in the switching system shown in FIG. 1. The output interface assumes again that the central switching fabric has 4 inputs and 4 outputs.

Referring to the output interface shown in FIG. 6, an incoming optical signal is first demultiplexed into its individual wavelength components (or into N distinct modulated wavelengths) in a demultiplexor 620, for example. The demultiplexor used can be of any type available but, as mentioned earlier, is likely to be identical to the demultiplexors used in the switch fabric so as to minimize the number of parts used in the system. Once the optical signal has been demultiplexed, each wavelength component is forwarded to its own receiver (630, 640, 650 and 660 for W1, W3, W2 and W4 respectively). Receivers 630, 640, 650 and 660 convert the optical signal into an electronic signal and provide an input to the associated clock generators 632, 642, 652 and 662. The clock generators provide two clock signals. The first one, BITCK, gives the bit clock for the received signal and is used to load bits into the serial-in-parallel-out shift registers 634, 644, 654 and 664. The second signal, WCK, is synchronized to BITCK but eight times slower. It is used to write, every cycle, the byte contained in the shift registers 634, 644, 654 and 664 into the corresponding buffers 636, 646, 656 and 666. Note that the clock signals, WCK and BITCK, provided by the different clock generators need not be in phase or even identical.

Once the data bytes have been written into the buffers 636, 646, 656 or 666, each associated to information originating from a given input node, they are available to the output node. The output node uses the clock RCK to read data bytes out of buffers 636, 646, 656 and 666 and forwards them to their final destination.

Having thus described our invention, what we claim as new and desire to secure by Letters Patents is:

1. In a wavelength division switching network having a central switching fabric which has N demultiplexors with each demultiplexor having one input port and N outputs, said N outputs for each demultiplexor lying in a single plane of a first set of N nonintersecting planes of said switching fabric, said fabric also having N multiplexors with each of said multiplexors having N inputs and one output port, said N inputs of each of said multiplexors lying in a single plane of a second set of N nonintersecting planes of said switching fabric, each input in each plane of said second set of planes in optical contact with only one output in only one of said first set of planes with no two inputs of said each plane of said second set of planes in optical contact with outputs on the same plane of said first set of planes, a method of transmitting from any one of said input ports of demultiplexors to any one of said output ports of said multiplexors comprising the steps of:

(a) for a data stream to be transmitted to one of said output ports of said N multiplexors, modulating a particular wavelength of N wavelengths with said each data stream to be transmitted from an input port of one of said N demultiplexors to an output port of a selected one of said N multiplexors, said particular wavelength corresponding to said input port and said selected output port;

(b) multiplexing, for each input port of said demultiplexors, said N wavelengths, modulated as in step (a), said N wavelengths to be transmitted to N different output ports of said N multiplexors;

(c) demultiplexing N modulated wavelengths, multiplexed in step (b), with one of said demultiplexors into distinct modulated wavelengths by separating said N modulated wavelengths at a first branch point of said one demultiplexor into two distinct first subgroups of N/2 modulated wavelengths with each first subgroup being assigned to one of two first branches extending from said first branch point, said each first subgroup of N/2 modulated wavelengths being further separated at a corresponding second branch point on each one of said first branches into two distinct second subgroups of N/4 modulated wavelengths resulting in four distinct second subgroups with each second subgroup being assigned to one of a pair of second branches extending from a corresponding second branch point, further separating, if necessary, said second subgroups as above until an n-th subgroup has only one modulated wavelength, with the n-th branches of said one demultiplexor being said N outputs of said one demultiplexor, thereby forming for one said demultiplexor an assignment scheme of subgroups to branches with a respective assignment scheme for each other of said demultiplexors being a permutation of said assignment scheme for said one demultiplexor when N modulated wavelengths are demultiplexed as above by each other of said N demultiplexors, the assignment scheme of subgroups to said n-th branches being different for said each of said demultiplexors, with no two outputs in the same output position of any two of said demultiplexors having the same wavelength assigned thereto, with each subgroup for each assignment scheme still having the same wavelengths therein and with each pair of subgroups assigned to branches extending from a common branch point still being assigned to branches extending from a common branch point, thereby having N distinct modulated wavelengths from said N distinct wavelengths assigned to said N outputs of said each demultiplexor, the modulated wavelength appearing on said each output of said each demultiplexor corresponding to modulated wavelengths assigned thereto, with no two modulated wavelengths from the same wavelength appearing in the same output position of two planes of said first set of N planes, thereby having N distinct modulated wavelengths from said N distinct wavelengths in the same output position in said first set of N planes, which said same output position in said first set of N planes lies in one plane of said second set on N planes, thereby having N distinct modulated wavelengths from said N distinct wavelengths appearing on said N inputs of said each multiplexor, said N inputs of said each multiplexor being in one plane of said second set of N planes; and (d) multiplexing N modulated wavelengths at N inputs of each of said N multiplexors, thereby having N modulated wavelengths from said N distinct wavelengths at each single output port of said each multiplexor with each of said N modulated wavelengths at each output port being transmitted from a different input port of said N demultiplexors.

2. A method as recited in claim 1, wherein said first set of planes has N parallel planes and said second set of planes has N parallel planes.

3. A method as recited in claim 1, wherein said first set of planes has N horizontal planes and said second set of planes has N vertical planes.

4. In a wavelength division switching network having a central swtiching fabric which has N demultiplexors with each demultiplexor having one input port and N outputs, said N outputs for each demultiplexor lying in a single horizontal plane, said switching fabric thus having N parallel horizontal planes with N outputs in each of said horizontal planes, said fabric also having N multiplexors with each of said multiplexors having N inputs and one output port, said N inputs lying in a single vertical plane, said switching fabric thus having N parallel vertical planes with N inputs in each of said vertical planes, each input in each vertical plane in optical contact with only one output in only one of said horizontal planes with no two inputs of said each vertical plane in optical contact with outputs on the same horizontal plane of said N horizontal planes, a method of transmitting from any one of said input ports of demultiplexors to any one of said output ports of said multiplexors comprising the steps of:

(a) for a data stream to be transmitted to one of said output ports of said N multiplexors, modulating a particular wavelength of N wavelengths with said each data stream to be transmitted from an input port of one of said N demultiplexors to an output port of a selected one of said N multiplexors, said particular wavelength corresponding to said input port and said selected output port;

(b) multiplexing, for each input port of said demultiplexors, said N wavelengths, modulated as in step (a), said N wavelengths to be transmitted to N different output ports of said N multiplexors;

(c) demultiplexing N modulated wavelengths, multiplexed in step (b), with one of said demultiplexors into distinct modulated wavelengths by separating said N modulated wavelengths at a first branch point of said one demultiplexor into two distinct first subgroups of N/2 modulated wavelengths with each first subgroup being assigned to one of two first branches extending from said first branch point, said each first subgroup of N/2 modulated wavelengths being further separated at a corresponding second branch point on each one of said first branches into two distinct second subgroups of N/4 modulated wavelengths resulting in four distinct second subgroups with each second subgroup being assigned to one of a pair of second branches extending from a corresponding second branch point, further separating, if necessary, said second subgroups as above until an n-th subgroup has only one modulated wavelength, with the n-th branches of said one demultiplexor being said N outputs of said one demultiplexor, thereby forming for one said demultiplexor an assignment scheme of subgroups to branches with a respective assignment scheme for each other of said demultiplexors being a permutation of said assignment scheme for said one demultiplexor when N modulated wavelengths are demultiplexed as above by each other of said N demultiplexors, the assignment scheme of subgroups to said n-th branches being different for said each of said demultiplexors, with no two outputs in the same output position of any two of said demultiplexors having the same wavelength assigned thereto, with each subgroup for each assignment scheme still having the same wavelengths therein and with each pair of subgroups assigned to branches extending from a common branch point still being assigned to branches extending from a common branch point, thereby having N distinct modulated wavelengths from said N distinct wavelengths assigned to said N outputs of said each demultiplexor, the modulated wavelength appearing on said each output of said each demultiplexor corresponding to modulated wavelengths assigned thereto, with no two modulated wavelengths from the same wavelength appearing in the same output position of two horizontal planes, thereby having N distinct modulated wavelengths from said N distinct wavelengths in the same output position in said N horizontal planes, which said same output position in said N horizontal planes lies in one of said vertical planes, thereby having N distinct modulated wavelengths from said N distinct wavelengths appearing on said N inputs of said each multiplexor, said N inputs of said each multiplexor being in one of said N vertical planes; and (d) multiplexing N modulated wavelengths at N inputs of each of said N multiplexors, thereby having N modulated wavelengths from said N distinct wavelengths at each single output port of said each multiplexor with each of said N modulated wavelengths at each output port being transmitted from a different input port of said N demultiplexors.

5. A method as recited in claim 4, wherein said branch points are Mach-Zehnder filters and said branches are the outputs of said filters.

6. A method as recited in claim 4, wherein one of said first subgroups comprises even numbered modulated wavelengths $W2, W4, W6, \ldots$ which are equally spaced by a frequency spacing $2f$ and the other of said first subgroups comprises an odd set of wavelengths $W1, W3, W5, \ldots$ which are equally spaced by frequency spacing $2f$, each said subgroup being a subset of the group of N distinct modulated wavelengths $W1, W2, W3, W4, \ldots, WN$, where $f$ is a frequency separation between said wavelengths in said group.

7. A method as recited in claim 4, where two of said second subgroup comprises odd numbered wavelengths separated by frequency spacing $4f$.

8. A method as recited in claim 4 wherein two of said second subgroups comprises even numbered wavelengths separated by frequency spacing $4f$.

9. A method as recited in claim 4 wherein each of said x-th subgroups has wavelengths separated by frequency spacing $2^x(f)$ where x is an integer and $1 \leq x < n$.

10. In a wavelength division switching network having a central switching fabric which has N demultiplexors with each demultiplexor having one input port and N outputs, said N outputs for each demultiplexor lying in a single horizontal plane, said switching fabric thus having N parallel horizontal planes with N outputs in each of said horizontal planes, said fabric also having N multiplexors with each of said multiplexors having N inputs and one output port, said N inputs lying in a single vertical plane, said switching fabric thus having N parallel vertical planes with N inputs in each of said vertical planes, each input in each vertical plane in optical contact with only one output in only one of said horizontal planes with no two inputs of said each vertical plane in optical contact with outputs on the same horizontal plane of said N horizontal planes, each demultiplexor of said fabric having a tree structure with Mach-Zehnder filters as branch points of said structure with a pair of outputs from each filter being branches of said structure, a method of transmitting from any one of said input ports of demultiplexors to any one of said output ports of said multiplexors, comprising the steps of:

(a) for a data stream to be transmitted to one of said output ports of said N multiplexors, modulating a particular wavelength of N wavelengths with said a data stream to be transmitted from an input port of one of said N demultiplexors to a selected output port of one of said N multiplexors, said particular wavelength corresponding to said input port and said selected output port;

(b) multiplexing, for each input port of said demultiplexors, said N wavelengths, modulated as in step (a), said N wavelengths to be transmitted to N different output ports of said N multiplexors;

(c) demultiplexing N modulated wavelengths, multiplexed in step (b), with one of said demultiplexors into distinct modulated wavelengths by separating said N modulated wavelengths at a first Mach-Zehnder filter of said one demultiplexor into two distinct first subgroups of N/2 modulated wavelengths with each first subgroup being assigned to one of two first branches extending from said first Mach-Zehnder filter, one of said first subgroups having even numbered wavelengths $W2, W4, W6, \ldots$, which are equally spaced by a frequency space $2f$ and the other of said first subgroups having odd numbered wavelengths $W1, W3, W5, \ldots, W(2^{n-1})$ which are off, equally spaced by frequency spacing $2f$, said each first subgroup of N/2 modulated wavelengths being further separated at a corresponding second Mach-Zehnder filter on each one of said first branches into two distinct second subgroups of N/4 modulated wavelengths resulting in four distinct second subgroups with each second subgroup being assigned to one of a pair of second branches extending from a corresponding second branch point, each of said second subgroups having wavelengths which are equally spaced by a frequency space $4f$, further separating as above, said second subgroups into equally spaced subgroups with correspondingly wider frequency spacing $2^x(f)$ where x is an x-th subgroup, all of said subgroups being a subset of the group of distinct modulated wavelengths $W1, W2, W3, \ldots, W2^n$, where $f$ is a frequency separation between said wavelengths in said group, said separating continuing until an n-th subgroup has only one modulated wavelength, with the n-th branches of said one demultiplexor being said N outputs of one each demultiplexor, thereby forming for said one demultiplexor a respective assignment scheme of subgroups to branches with a respective assignment scheme for each other of said demultiplexors being a permutation of said assignment scheme for said one demultiplexor when N modulated wavelengths are demultiplexed as above by each other of said N demultiplexors, the assignment scheme of subgroups to said n-th branches being different for each other of said demultiplexors, with no two outputs in the same output position of any two of said demultiplexors having the same wavelength assigned thereto, with each subgroup for each assignment scheme still having the same wavelengths therein and with each pair of subgroups assigned to branches extending from a common branch point still being assigned to branches extending from a common branch point, thereby having N distinct modulated wavelengths from said N distinct wavelengths assigned to said N outputs of said each demultiplexor, the modulated wavelength appearing on said each output of said each demultiplexor corresponding to modulated wavelengths assigned thereto, with no two modulated wavelengths from the same wavelength appearing in the same output position of two horizontal planes, thereby having N distinct modulated wavelengths from said N distinct wavelengths in the same output position in said N horizontal planes, which said same output position in said N horizontal planes lies in one of said N vertical planes, thereby having N distinct modulated wavelengths from said N distinct wavelengths appearing on said N inputs of said each multiplexor, said N inputs of said each multiplexor being in one of said N vertical planes; and (d) multiplexing N modulated wavelengths at N inputs of each of said N multiplexors, thereby having N modulated wavelengths from said N distinct wavelengths at each single output port of said each multiplexor with each of said N modulated wavelengths being transmitted from a different input port of said N demultiplexors.

* * * * *